(12) United States Patent
He (10) Patent No.: US 9,071,144 B2
(45) Date of Patent: Jun. 30, 2015

(54) ADAPTIVE CURRENT CONTROL TIMING AND RESPONSIVE CURRENT CONTROL FOR INTERFACING WITH A DIMMER

(71) Applicant: Cirrus Logic, Inc., Austin, TX (US)

(72) Inventor: Zhaohui He, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 158 days.

(21) Appl. No.: 13/715,584

(22) Filed: Dec. 14, 2012

(65) Prior Publication Data
US 2013/0154495 A1 Jun. 20, 2013

Related U.S. Application Data

(60) Provisional application No. 61/570,554, filed on Dec. 14, 2011.

(51) Int. Cl.
*H05B 37/02* (2006.01)
*H02M 3/335* (2006.01)
(Continued)

(52) U.S. Cl.
CPC .......... *H02M 7/217* (2013.01); *H02M 3/33507* (2013.01); *Y02B 70/1491* (2013.01);
(Continued)

(58) Field of Classification Search
CPC ........... H05B 33/0815; H05B 33/0845; H05B 37/02; H05B 41/3921; H05B 41/3924; H05B 33/0818; H05B 33/0848; H02M 2001/0006; H02M 3/33507; Y02B 20/346; Y10S 323/905

USPC ......... 315/194, 291, 294, 247, 224, 307, 360, 315/200 R, 246, 185 R, 312; 323/282, 905; 363/89, 126
See application file for complete search history.

(56) References Cited

U.S. PATENT DOCUMENTS

| 4,523,128 A | 6/1985 | Stamm et al. |
| 5,055,746 A | 10/1991 | Hu et al. |

(Continued)

FOREIGN PATENT DOCUMENTS

| CN | 1459216 A | 11/2004 |
| CN | 1843061 A1 | 10/2006 |

(Continued)

OTHER PUBLICATIONS

International Search Report, PCT/US2012/069949, European Patent Office, Jul. 2, 2014, pp. 1-5.

(Continued)

*Primary Examiner* — Haissa Philogene
(74) *Attorney, Agent, or Firm* — Terrile, Cannatti, Chambers & Holland, LLP; Kent B. Chambers (57) ABSTRACT

In at least one embodiment, an electronic system adapts current control timing for half line cycle of a phase-cut input voltage and responsively controls a dimmer current in a power converter system. The adaptive current control time and responsive current control provides, for example, interfacing with a dimmer. The electronic system and method include a dimmer, a switching power converter, and a controller to control the switching power converter and controls a dimmer current. In at least one embodiment, the controller determines a predicted time period from a zero crossing until a leading edge of a phase-cut input voltage and then responsively controls the dimmer current to, for example, reduce current and voltage perturbations (referred to as "ringing"), improve efficiency, and reduce an average amount of power handled by various circuit components.

28 Claims, 10 Drawing Sheets

(51) Int. Cl.

| | | |
|---|---|---|
| *H02M 5/257* | (2006.01) | |
| *H02M 7/217* | (2006.01) | |
| *H02M 1/42* | (2007.01) | |
| *H02M 1/44* | (2007.01) | |
| *H05B 33/08* | (2006.01) | |
| *H02M 1/00* | (2007.01) | |

(52) U.S. Cl.
CPC ............ *Y02B70/126* (2013.01); *H02M 5/2576* (2013.01); *H05B 37/02* (2013.01); *H02M 2001/0048* (2013.01); *H02M 2001/0006* (2013.01); *Y02B 20/346* (2013.01); *H02M 1/4258* (2013.01); *H02M 3/33523* (2013.01); *Y02B 20/347* (2013.01); *H02M 1/44* (2013.01); *H05B 33/0815* (2013.01)

(56) References Cited

U.S. PATENT DOCUMENTS

| | | | |
|---|---|---|---|
| 5,179,324 A * | 1/1993 | Audbert | 315/194 |
| 5,319,301 A | 6/1994 | Callahan et al. | |
| 5,321,350 A | 6/1994 | Haas | |
| 5,430,635 A | 7/1995 | Liu | |
| 5,691,605 A | 11/1997 | Xia et al. | |
| 5,770,928 A | 6/1998 | Chansky et al. | |
| 6,043,635 A | 3/2000 | Downey | |
| 6,046,550 A | 4/2000 | Ference et al. | |
| 6,091,205 A | 7/2000 | Newman et al. | |
| 6,211,624 B1 | 4/2001 | Holzer | |
| 6,380,692 B1 | 4/2002 | Newman et al. | |
| 6,407,514 B1 | 6/2002 | Glaser et al. | |
| 6,621,256 B2 | 9/2003 | Muratov et al. | |
| 6,713,974 B2 | 3/2004 | Patcharnik et al. | |
| 6,858,995 B2 | 2/2005 | Lee et al. | |
| 6,900,599 B2 | 5/2005 | Ribarich | |
| 7,102,902 B1 | 9/2006 | Brown et al. | |
| 7,180,250 B1 | 2/2007 | Gannon | |
| 7,184,937 B1 | 2/2007 | Su et al. | |
| 7,656,103 B2 | 2/2010 | Shteynberg et al. | |
| 7,719,246 B2 | 5/2010 | Melanson | |
| 7,728,530 B2 | 6/2010 | Wang et al. | |
| 7,733,678 B1 | 6/2010 | Notohamiprodjo et al. | |
| 7,759,881 B1 | 7/2010 | Melanson | |
| 7,786,711 B2 | 8/2010 | Wei et al. | |
| 7,872,427 B2 | 1/2011 | Scianna | |
| 8,102,167 B2 | 1/2012 | Irissou et al. | |
| 8,115,419 B2 | 2/2012 | Given et al. | |
| 8,169,154 B2 | 5/2012 | Thompson et al. | |
| 8,212,491 B2 | 7/2012 | Kost | |
| 8,212,492 B2 | 7/2012 | Lam et al. | |
| 8,222,832 B2 | 7/2012 | Zheng et al. | |
| 8,482,220 B2 | 7/2013 | Melanson | |
| 8,487,546 B2 * | 7/2013 | Melanson | 315/291 |
| 8,508,147 B2 * | 8/2013 | Shen | 315/287 |
| 8,536,794 B2 | 9/2013 | Melanson et al. | |
| 8,536,799 B1 * | 9/2013 | Grisamore et al. | 315/294 |
| 8,547,034 B2 * | 10/2013 | Melanson et al. | 315/247 |
| 8,569,972 B2 | 10/2013 | Melanson | |
| 8,610,364 B2 * | 12/2013 | Melanson et al. | 315/200 R |
| 8,610,365 B2 * | 12/2013 | King et al. | 315/246 |
| 8,664,885 B2 * | 3/2014 | Koolen et al. | 315/291 |
| 8,716,957 B2 * | 5/2014 | Melanson et al. | 315/360 |
| 8,749,173 B1 | 6/2014 | Melanson et al. | |
| 8,847,515 B2 * | 9/2014 | King et al. | 315/307 |
| 2002/0140371 A1 | 10/2002 | Chou et al. | |
| 2004/0105283 A1 | 6/2004 | Schie et al. | |
| 2004/0212321 A1 | 10/2004 | Lys | |
| 2006/0022648 A1 | 2/2006 | Ben-Yaakov et al. | |
| 2006/0208669 A1 | 9/2006 | Huynh et al. | |
| 2007/0182338 A1 | 8/2007 | Shteynberg | |
| 2007/0182347 A1 | 8/2007 | Shteynberg | |
| 2008/0018261 A1 | 1/2008 | Kastner | |
| 2008/0143266 A1 | 6/2008 | Langer | |
| 2008/0192509 A1 | 8/2008 | Dhuyvetter et al. | |
| 2008/0205103 A1 | 8/2008 | Sutardja et al. | |
| 2008/0224629 A1 | 9/2008 | Melanson | |
| 2008/0224633 A1 | 9/2008 | Melanson | |
| 2008/0224636 A1 | 9/2008 | Melanson | |
| 2009/0134817 A1 | 5/2009 | Jurngwirth et al. | |
| 2009/0195186 A1 | 8/2009 | Guest et al. | |
| 2009/0284182 A1 | 11/2009 | Cencur | |
| 2010/0002480 A1 | 1/2010 | Huynh et al. | |
| 2010/0013405 A1 | 1/2010 | Thompson et al. | |
| 2010/0013409 A1 | 1/2010 | Quek et al. | |
| 2010/0066328 A1 | 3/2010 | Shimizu et al. | |
| 2010/0164406 A1 | 7/2010 | Kost et al. | |
| 2010/0213859 A1 | 8/2010 | Shteynberg et al. | |
| 2010/0231136 A1 | 9/2010 | Reisenbauer et al. | |
| 2010/0244726 A1 | 9/2010 | Melanson | |
| 2011/0043133 A1 | 2/2011 | Van Laanen et al. | |
| 2011/0080110 A1 | 4/2011 | Nuhfer et al. | |
| 2011/0084622 A1 | 4/2011 | Barrow et al. | |
| 2011/0084623 A1 | 4/2011 | Barrow | |
| 2011/0115395 A1 | 5/2011 | Barrow et al. | |
| 2011/0121754 A1 | 5/2011 | Shteynberg | |
| 2011/0148318 A1 | 6/2011 | Shackle et al. | |
| 2011/0204797 A1 | 8/2011 | Lin et al. | |
| 2011/0204803 A1 | 8/2011 | Grotkowski et al. | |
| 2011/0234115 A1 | 9/2011 | Shimizu et al. | |
| 2011/0266968 A1 | 11/2011 | Bordin et al. | |
| 2011/0291583 A1 | 12/2011 | Shen | |
| 2011/0309759 A1 | 12/2011 | Shteynberg et al. | |
| 2012/0049752 A1 | 3/2012 | King et al. | |
| 2012/0068626 A1 | 3/2012 | Lekatsas et al. | |
| 2012/0098454 A1 | 4/2012 | Grotkowski et al. | |
| 2012/0133291 A1 | 5/2012 | Kitagawa et al. | |
| 2012/0286686 A1 | 11/2012 | Watanabe et al. | |
| 2013/0015768 A1 | 1/2013 | Roberts et al. | |
| 2013/0154495 A1 | 6/2013 | Zhaohui | |
| 2014/0009082 A1 | 1/2014 | King et al. | |

FOREIGN PATENT DOCUMENTS

| | | |
|---|---|---|
| CN | 101637064 A | 1/2010 |
| EP | 1164819 | 12/2001 |
| EP | 2257124 A1 | 1/2010 |
| EP | 2232949 | 9/2010 |
| EP | 2257124 A1 | 12/2010 |
| JP | 2008053181 A | 3/2008 |
| JP | 2009170240 A | 7/2009 |
| WO | 9917591 | 4/1999 |
| WO | 02096162 | 11/2002 |
| WO | 2006079937 | 8/2006 |
| WO | 2008029108 | 3/2008 |
| WO | 2008112822 A2 | 9/2008 |
| WO | 2010011971 A1 | 1/2010 |
| WO | 2010035155 A2 | 4/2010 |
| WO | 2011008635 A1 | 1/2011 |
| WO | 2011050453 A1 | 5/2011 |
| WO | 2011056068 A2 | 5/2011 |
| WO | 2012016197 A1 | 2/2012 |
| WO | 2010027493 A2 | 3/2012 |

OTHER PUBLICATIONS

Written Opinion, PCT/US2012/069949, European Patent Office, Jul. 2, 2014, pp. 1-6.

Amanci, et al, "Synchronization System with Zero-Crossing Peak Detection Algorithm for Power System Applications", The 2010 International Power Electronics Conference, pp. 2984-2991, Toronto, Ontario, Canada.

Patterson, James, "Efficient Method for Interfacing Triac Dimmers and LEDs", National Semiconductor Corp., pp. 29-32, Jun. 23, 2011, USA.

Vainio, Olli, "Digital Filtering for Robust 50/60 Hz Zero-Crossing Detectors", IEEE Transactions on Instrumentation and Measurement, vol. 45, No. 2, pp. 426-430, Apr. 1996, University of Santa Barbara, California, USA.

Azoteq, IQS17 Family, IQ Switch—ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.

(56) References Cited

OTHER PUBLICATIONS

Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.

Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.

Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden.

Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.

Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.

Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.

Engdahl, Tomi, Light Dimmer Circuits, 1997-2000, www.epanorama.net.

O'Rourke, Conan, et al, Dimming Electronic Ballasts, National Lighting Product Information Program, Specifier Reports, vol. 7, No. 3, Oct. 1999, pp. 1-24, Troy, NY, USA.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

Lutron, Fluorescent Dimming Systems Technical Guide, copyright 2002, Why Different Dimming Ranges, http://www.lutron.com/TechnicalDocumentLibrary/LutronBallastpg3.pdf, p. 3, Coopersburg PA, USA.

Wu, Tsai-Fu, et al, Single-Stage Electronic Ballast with Dimming Feature and Unity Power Factor, IEEE Transactions on Power Electronics, vol. 13, No. 3, May 1998, pp. 586-597.

\* cited by examiner

ADAPTIVE CURRENT CONTROL TIMING AND RESPONSIVE CURRENT CONTROL FOR INTERFACING WITH A DIMMER

CROSS-REFERENCE TO RELATED APPLICATION

This application claims the benefit under 35 U.S.C. §119 (e) and 37 C.F.R. §1.78 of U.S. Provisional Application No. 61/570,554, filed Dec. 14, 2011, and is incorporated by reference in its entirety.

BACKGROUND OF THE INVENTION

1. Field of the Invention

The present invention relates in general to the field of electronics, and more specifically to a method and system for providing adaptive current control timing and responsive current control for interfacing with a dimmer.

2. Description of the Related Art

Electronic systems utilize dimmers to modify output power delivered to a load. For example, in a lighting system, dimmers provide an input signal to a lighting system, and the load includes one or more light sources such as one or more light emitting diodes (LEDs) or one or more fluorescent light sources. Dimmers can also be used to modify power delivered to other types of loads, such as one or more motors or one or more portable power sources. The input signal represents a dimming level that causes the lighting system to adjust power delivered to a lamp, and, thus, depending on the dimming level, increase or decrease the brightness of the lamp. Many different types of dimmers exist. In general, dimmers use a digital or analog coded dimming signal that indicates a desired dimming level. For example, some analog based dimmers utilize a triode for alternating current ("triac") device to modulate a phase angle of each cycle of an alternating current ("AC") supply voltage. "Modulating the phase angle" of the supply voltage is also commonly referred to as "chopping" or "phase cutting" the supply voltage. Phase cutting the supply voltage causes the voltage supplied to a lighting system to rapidly turn "ON" and "OFF" thereby controlling the average power delivered to the lighting system.

Figure 1:
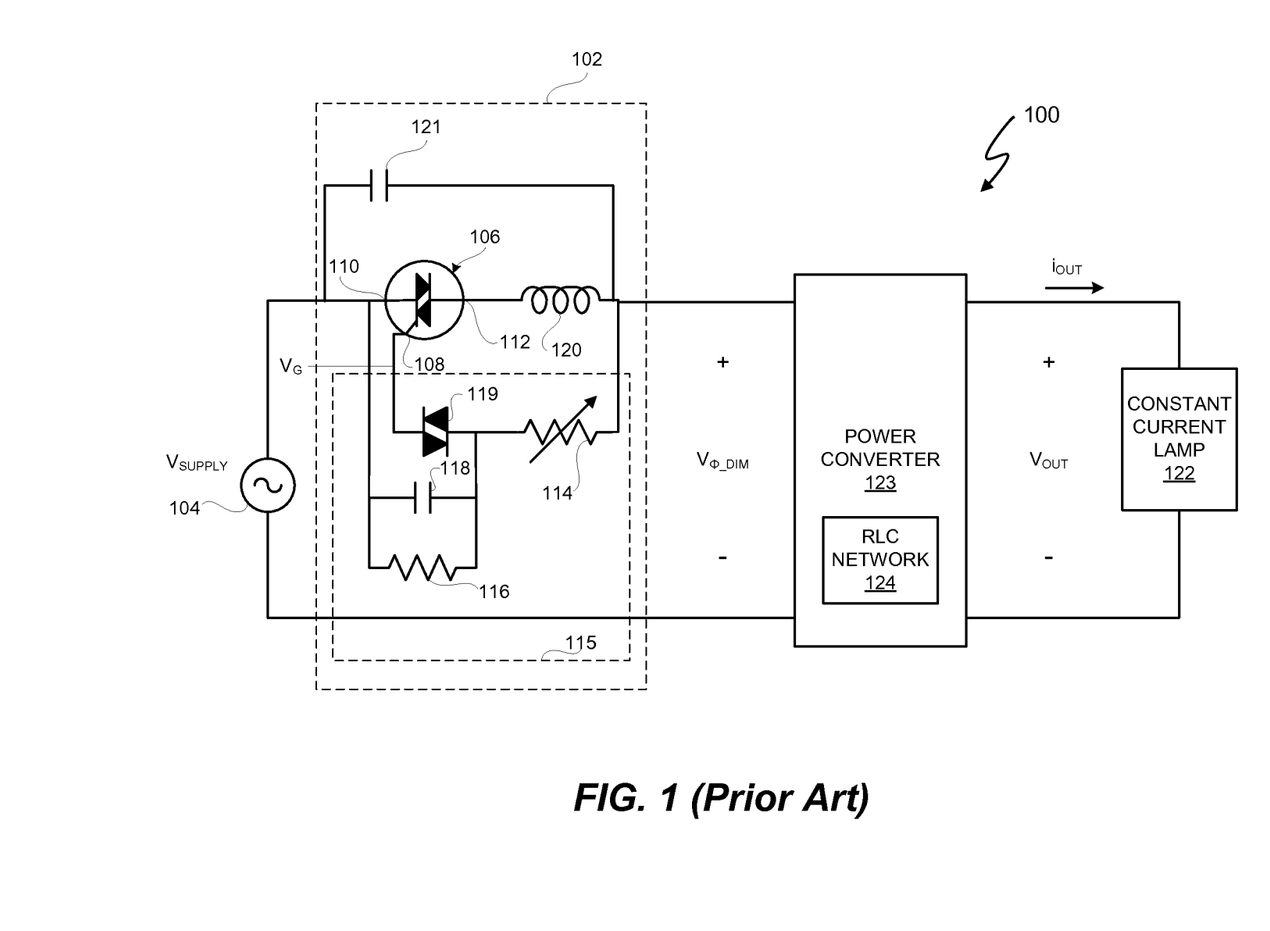
FIG. 1 (labeled prior art) depicts a lighting system that includes a leading edge dimmer.
Figure 2:
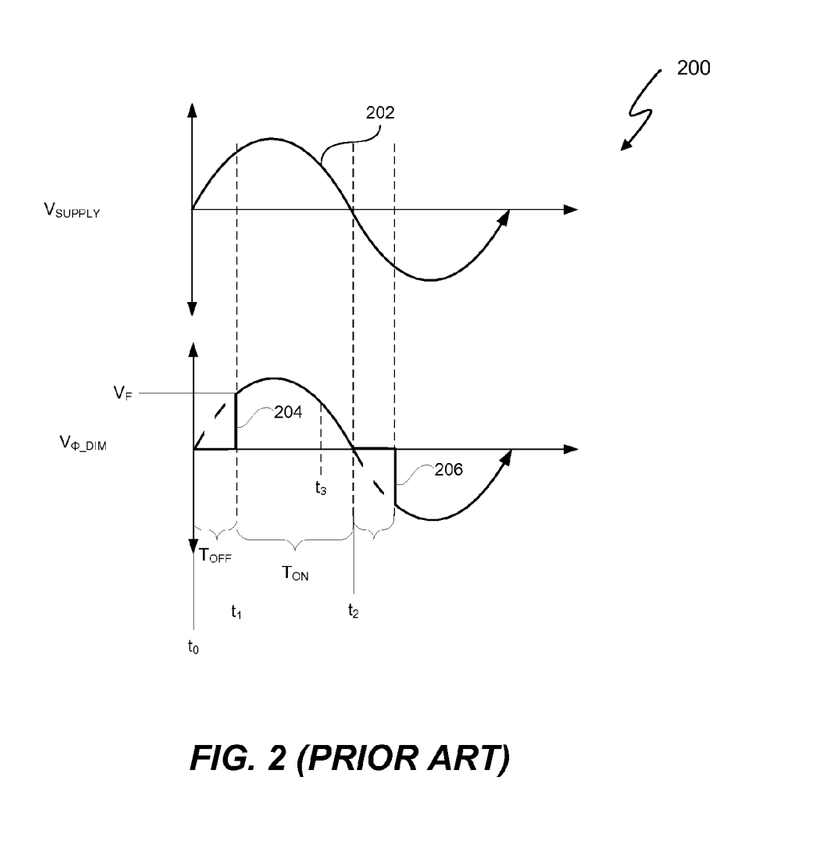
FIG. 2 (labeled prior art) depicts exemplary voltage graphs associated with the lighting system of FIG. 1.

FIG. 1 depicts a lighting system 100 that includes a leading edge, triac-based dimmer 102. FIG. 2 depicts ideal, exemplary voltage graphs 200 associated with the lighting system 100. Referring to FIGS. 1 and 2, the lighting system 100 receives an AC supply voltage $V_{SUPPLY}$ from voltage supply 104. The supply voltage $V_{SUPPLY}$, indicated by voltage waveform 202, is, for example, a nominally 60 Hz/110 V line voltage in the United States of America or a nominally 50 Hz/220 V line voltage in Europe. A leading edge dimmer phase cuts leading edges, such as leading edges 204 and 206, of each half cycle of supply voltage $V_{SUPPLY}$. Since each half cycle of supply voltage $V_{SUPPLY}$ is 180 degrees of the supply voltage $V_{SUPPLY}$, a leading edge dimmer phase cuts the supply voltage $V_{SUPPLY}$ at an angle greater than 0 degrees and less than 180 degrees. Generally, the voltage phase cutting range of a leading edge dimmer 102 is approximately 10 degrees to 170 degrees. The leading edge dimmer 102 can be any type of leading edge dimmer such as a triac-based leading edge dimmer available from Lutron Electronics, Inc. of Coopersberg, Pa. ("Lutron"). A triac-based leading edge dimmer is described in the Background section of U.S. patent application Ser. No. 12/858,164, entitled Dimmer Output Emulation, filed on Aug. 17, 2010, and inventor John L. Melanson.

Triac 106 acts as voltage-driven switch, and a gate terminal 108 of triac 106 controls current flow between the first terminal 110 and the second terminal 112. A gate voltage $V_G$ on the gate terminal 108 will cause the triac 106 to turn ON and current $i_{DIM}$ when the gate voltage $V_G$ reaches a firing threshold voltage value $V_F$ and a voltage potential exists across the first and second terminals 110 and 112. The dimmer output voltage $V_{\phi\_DIM}$ is zero volts from the beginning of each of half cycles 202 and 204 at respective times $t_0$ and $t_2$ until the gate voltage $V_G$ reaches the firing threshold voltage value $V_F$. Dimmer output voltage $V_{\phi\_DIM}$ represents the output voltage of dimmer 102. During timer period $T_{OFF}$, the dimmer 102 chops the supply voltage $V_{SUPPLY}$ so that the dimmer output voltage $V_{\phi\_DIM}$ remains at zero volts during time period $T_{OFF}$. At time $t_1$, the gate voltage $V_G$ reaches the firing threshold value $V_F$, and triac 106 begins conducting. Once triac 106 turns ON, the dimmer voltage $V_{\phi\_DIM}$ tracks the supply voltage $V_{SUPPLY}$ during time period $T_{ON}$. Once triac 106 turns ON, triac 106 continues to conduct current $i_{DIM}$ regardless of the value of the gate voltage $V_G$ as long as the current $i_{DIM}$ remains above a holding current value HC. The holding current value HC is a function of the physical characteristics of the triac 106. Once the current $i_{DIM}$ drops below the holding current value HC, i.e. $i_{DIM}$<HC, triac 106 turns OFF, i.e. stops conducting, until the gate voltage $V_G$ again reaches the firing threshold value $V_F$. The holding current value HC is generally low enough so that, ideally, the current $i_{DIM}$ drops below the holding current value HC when the supply voltage $V_{SUPPLY}$ is approximately zero volts near the end of the half cycle 202 at time $t_2$.

The variable resistor 114 in series with the parallel connected resistor 116 and capacitor 118 form a timing circuit 115 to control the time $t_1$ at which the gate voltage $V_G$ reaches the firing threshold value $V_F$. Increasing the resistance of variable resistor 114 increases the time $T_{OFF}$, and decreasing the resistance of variable resistor 114 decreases the time $T_{OFF}$. The resistance value of the variable resistor 114 effectively sets a dimming value for lamp 122. Diac 119 provides current flow into the gate terminal 108 of triac 106. The dimmer 102 also includes an inductor choke 120 to smooth the dimmer output voltage $V_{\phi\_DIM}$. Triac-based dimmer 102 also includes a capacitor 121 connected across triac 106 and inductor 120 to reduce electro-magnetic interference.

Ideally, modulating the phase angle of the dimmer output voltage $V_{\phi\_DIM}$ effectively turns the lamp 122 OFF during time period $T_{OFF}$ and ON during time period $T_{ON}$ for each half cycle of the supply voltage $V_{SUPPLY}$. Thus, ideally, the dimmer 102 effectively controls the average energy supplied to the lamp 122 in accordance with the dimmer output voltage $V_{\phi\_DIM}$.

The lighting system 100 includes a power converter 123 with a resistor, inductor, capacitor (RLC) network 124 to convert the dimmer voltage $V_{\phi\_DIM}$ to an approximately constant voltage and, thus, provide an approximately constant current $i_{OUT}$ to the constant current lamp 122 for a given dimmer phase angle. The triac-based dimmer 102 adequately functions in many circumstances. The triac-based dimmer 102 utilizes a "glue" current during the time $T_{OFF}$ to properly charge the timing circuitry. Additionally, electronic dimmers that include controllers, e.g. "smart" dimmers, utilize current during the time $T_{OFF}$ to provide power to the electronic dimmer. Providing the glue current to the dimmer for the time $T_{OFF}$ has conventionally been considered an unavoidable occurrence.

SUMMARY OF THE INVENTION

In one embodiment of the present invention, a method includes predicting a time period during a cycle of a phase-cut input voltage to a power converter system that is expected to occur in advance of a leading edge of the phase-cut input voltage. The method further includes during the cycle of the phase-cut input voltage, actively controlling a decreasing transition rate of a current conducted through a dimmer at least by the predicted time period that is expected to occur in advance of the leading edge of the phase-cut input voltage.

In another embodiment of the present invention, an apparatus includes a controller configured to predict a time period during a cycle of a phase-cut input voltage to a power converter system that is expected to occur in advance of a leading edge of the phase-cut input voltage. The controller is further configured to, during the cycle of the phase-cut input voltage, actively control a decreasing transition rate of a current conducted through a dimmer at least by the predicted time period that is expected to occur in advance of the leading edge of the phase-cut input voltage.

In a further embodiment of the present invention, an apparatus includes a load, a switching power converter, and a controller coupled to the switching power converter and the load. The controller is configured to predict a time period during a cycle of a phase-cut input voltage to a power converter system that is expected to occur in advance of a leading edge of the phase-cut input voltage. The controller is further configured to, during the cycle of the phase-cut input voltage, actively control a decreasing transition rate of a current conducted through a dimmer at least by the predicted time period that is expected to occur in advance of the leading edge of the phase-cut input voltage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In at least one embodiment, an electronic system adapts current control timing for half line cycle of a phase-cut input voltage and responsively controls a dimmer current in a power converter system. The adaptive current control time and responsive current control provides, for example, interfacing with a dimmer. The electronic system and method include a dimmer, a switching power converter, and a controller to control the switching power converter and controls a dimmer current. In at least one embodiment, the controller determines a predicted time period from a zero crossing until a leading edge of a phase-cut input voltage and then responsively controls the dimmer current to, for example, reduce current and voltage perturbations (referred to as "ringing"), improve efficiency, and reduce an average amount of power handled by various circuit components.

For a triac-based dimmer during a period (referred to as "$T_{OFF}$") of a phase-cut input voltage half line cycle from the time the half line cycle reaches a zero crossing until reaching a leading edge of a phase-cut input voltage, the dimmer does not conduct and, thus, phase cuts the supply voltage prior to conducting. During the non-conduction period $T_{OFF}$, to properly recharge timing circuitry of the dimmer, the dimmer current has a glue value and is sometimes referred to in this non-conduction phase as a "glue current". The glue value varies by dimmer from, for example, 10 mA to 300 mA. When the output voltage of the dimmer (referred to as phase-cut voltage "$V_{\phi\_DIM}$") reaches a firing voltage $V_F$ level, the dimmer fires (i.e. begins conducting) and conducts a dimmer current having a firing value and is sometimes referred to at this event as a "firing current." A typical firing value is 5 mA-50 mA. Thus, the firing value is often less than the glue value. Conventionally, the dimmer current virtually instantly transitions from the glue current value to the firing current value. Accordingly, a steep dimmer current transition occurs when the dimmer current transitions from the glue current to the firing current. The steep transition can result in undesirable ringing in a resistor-inductor-capacitor ("RLC network") in the electronic system.

In at least one embodiment, the controller monitors a phase-cut input voltage to determine when leading edges of the phase cut voltage occur. The controller utilizes the history of when one or more leading edges occurred to predict a time period during a current or future cycle of the phase-cut input voltage to a switching power converter that is expected to occur in advance of a leading edge of the phase-cut input voltage Then, during a cycle of the phase-cut input voltage, the controller actively controls a decreasing transition rate of the dimmer current conducted through the dimmer at least by the predicted time period that is expected to occur in advance of the leading edge of the phase-cut input voltage.

Figure 3:
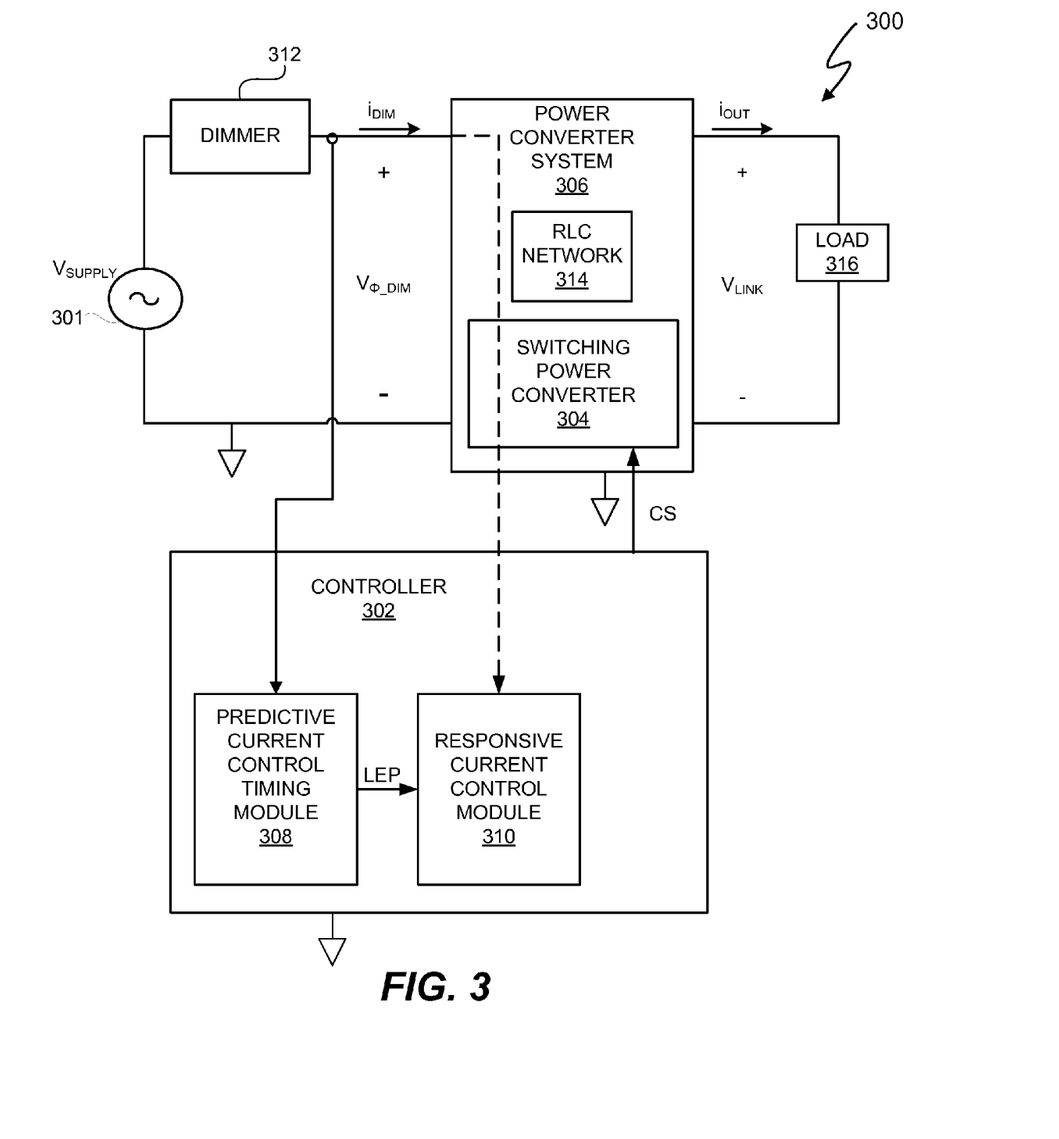
FIG. 3 depicts an electronic system that includes a controller to control current in accordance with adaptive timing and responsive current control.

FIG. 3 depicts an electronic system 300 that includes a controller 302 to generate a control signal CS to control a switching power converter 304 of a power converter system 306. The controller 302 controls current in accordance with adaptive timing and responsive current control. A voltage supply 301 supplies a supply voltage $V_{SUPPLY}$ to the electronic system 300. In at least one embodiment, the voltage supply 301 can be any voltage supply sufficient to provide power to load 316 and, in at least one embodiment, is the same as voltage supply 104. The dimmer 312 phase cuts the supply voltage $V_{SUPPLY}$ to generate the phase cut input voltage $V_{\phi\_DIM}$ to the power converter system 306. In at least one embodiment, the dimmer 312 is a triac-based dimmer, such as dimmer 102. The switching power converter 304 can be any type of switching power converter such as a boost, flyback, boost-buck, or Ćuk type switching power converter. The load 316 can be any type of load, such as a load that includes one or more light emitting diodes.

The controller 302 includes a predictive current control timing module 308 to predict a time period in advance of when a leading edge, such as leading edge 204 (FIG. 2) of a phase-cut input voltage $V_{\phi\_DIM}$ to the power converter system 306, or to a rectified version of the phase-cut input voltage $V_{\phi\_DIM}$, is expected to occur. The controller 302 also includes a responsive current control module 310 that receives a leading edge prediction signal LEP. The responsive current control module 310 utilizes the leading edge prediction signal LEP to actively control a decreasing transition rate of the dimmer current $i_{DIM}$ conducted through the dimmer 312 at least by the predicted time period that is expected to occur in advance of the leading edge of the phase-cut input voltage $V_{\phi\_DIM}$. As subsequently described in more detail, by actively controlling the transition rate of the dimmer current $i_{DIM}$, in at least one embodiment, potential ringing in the resistor-inductor-capacitor ("RLC") network 314 is reduced.

Figure 4:
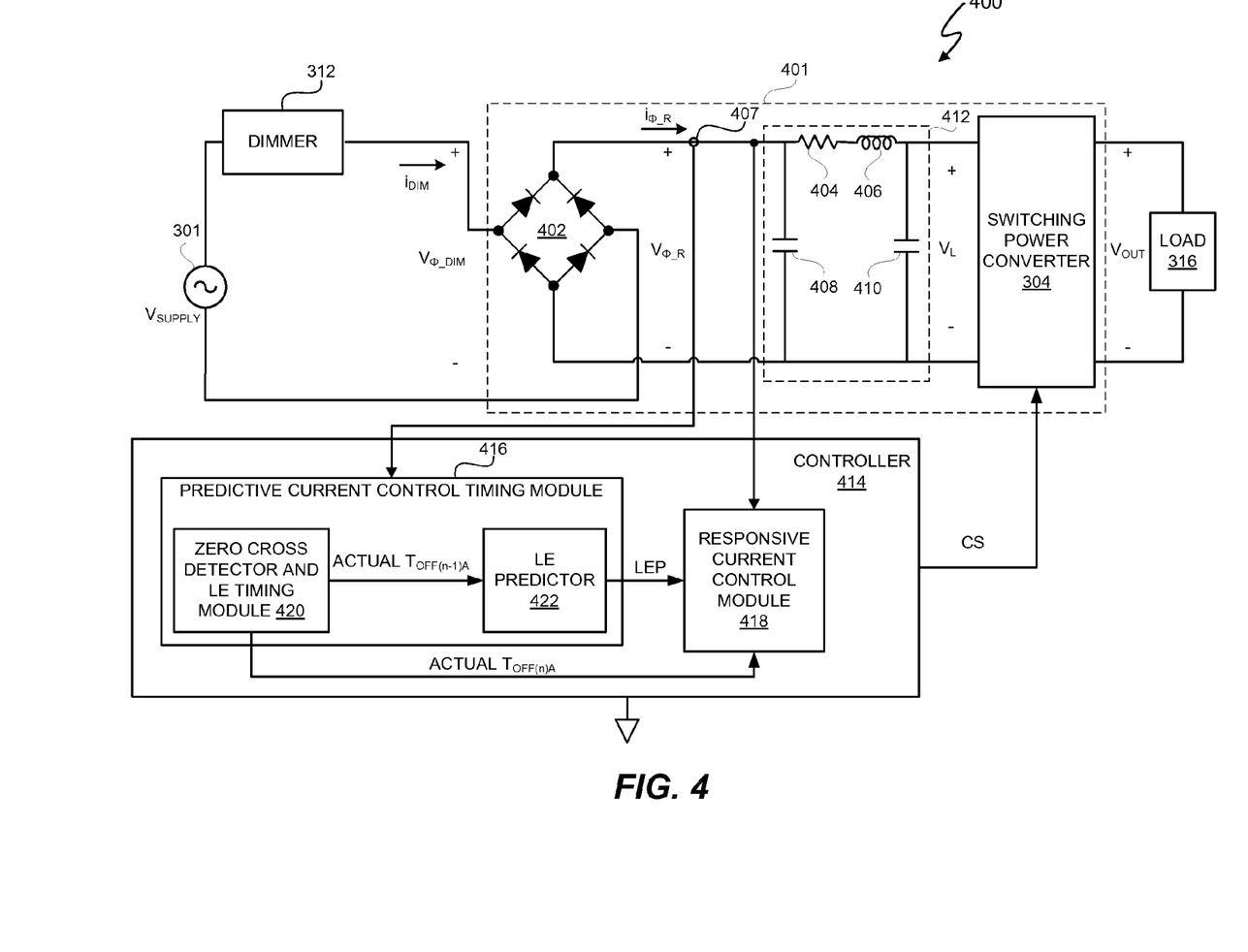
FIG. 4 depicts an electronic system representing one embodiment of the electronic system of FIG. 3.

FIG. 4 depicts an electronic system 400, which represents one embodiment of the electronic system 300. The power converter system 401, which represents one embodiment of the power converter system 306, includes a full bridge rectifier 402 that rectifies the phase-cut input voltage $V_{\phi\_DIM}$ to generate the rectified, phase-cut input voltage $V_{\phi\_R}$. Parasitic resistor 404, inductor 406, and capacitors 408 and 410 represent an RLC network 412, which represents one embodiment of RLC network 314. The switching power converter 304 receives a link voltage $V_L$ and generates an output voltage $V_{OUT}$ for load 316.

The electronic system 400 includes a controller 414, which includes a predictive current control timing module 416. Predictive current control timing module 416 represents one embodiment of predictive current control timing module 308 (FIG. 3). The predictive current control timing module 416 predicts a time period in advance of when a leading edge, such as leading edge 204 (FIG. 2) of the phase-cut input voltage $V_{\phi\_R}$ is expected to occur. The controller 414 also includes a responsive current control module 418 that receives a leading edge prediction signal LEP. The responsive current control module 418 utilizes the leading edge prediction signal LEP to actively control a decreasing transition rate of the dimmer current $i_{DIM}$ conducted through the dimmer 312 at least by the predicted time period that is expected to occur in advance of the leading edge of the phase-cut input voltage $V_{\phi\_R}$.

Figure 5:
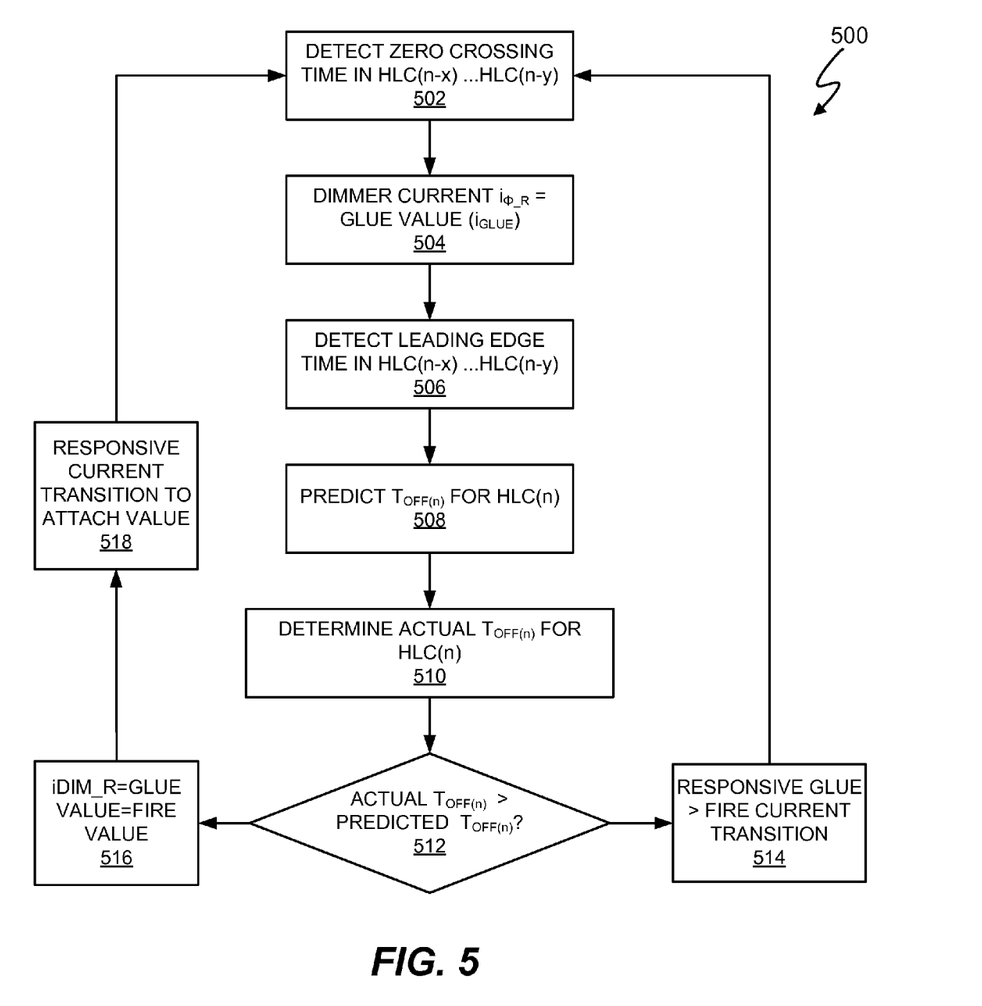
FIG. 5 depicts an adaptive timing and responsive current control process.
Figure 6:
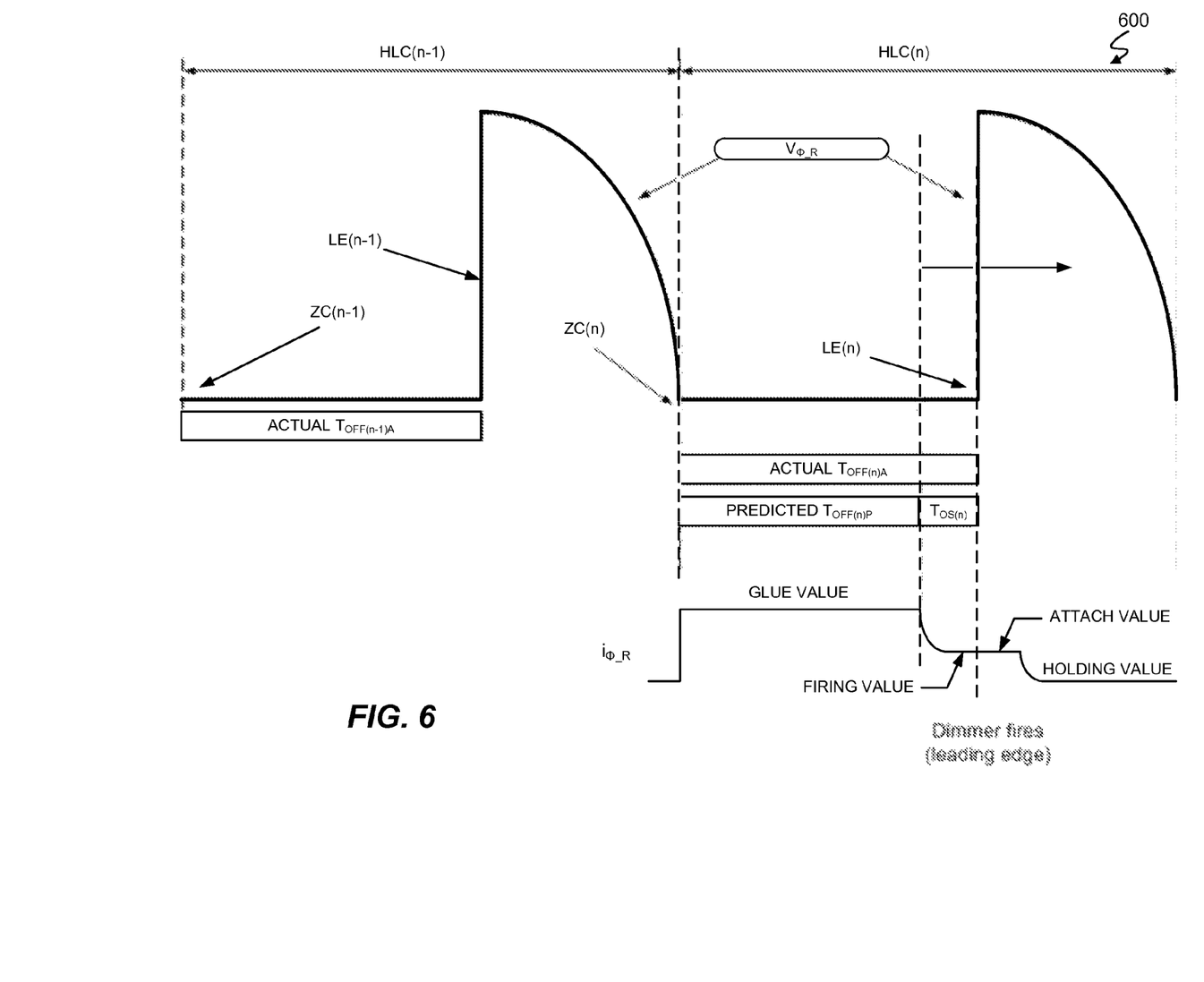
FIGS. 6-8 depict exemplary waveforms generated by the electronic system of FIG. 4 and the process of FIG. 6.

FIG. 5 depicts an adaptive timing and responsive current control process 500. Referring to FIGS. 4 and 5, in at least one embodiment, the predictive current control timing module 416 and responsive current control module 418 operate in accordance with the adaptive timing and responsive current control process 500. FIG. 6 depicts exemplary waveforms 600 for two half-line cycles HLC(n-1) and HLC(n) of the phase-cut input voltage $V_{\phi\_R}$ and rectified dimmer current $i_{\phi\_R}$. "n" is an index reference, and HLC(n) is a current half line cycle of the phase-cut input voltage $V_{\phi\_R}$, HLC(n-1) is an immediately preceding half-line cycle of the phase-cut input voltage $V_{\phi\_R}$, and so on. Referring to FIGS. 4, 5, and 6, in operation 502, the zero cross detector and leading edge (LE) timing module 420 detects zero crossings for (y-x) half line cycles HLC(n-x) through HLC(n-y), where "y" is a positive integer greater than or equal to "x", which is also a positive integer. A "zero crossing" is when the phase-cut input voltage $V_{\phi\_R}$ is approximately 0V. The LE predictor 422 utilizes the elapsed time between the zero crossings and leading edges of half-line cycles to predict when the leading edge of the current half line cycle HLC(n) will occur. The particular values of "x" and "y" are a matter of design choice.

In at least one embodiment, and as depicted in FIG. 6, the values of "x" and "y" are both 1, which indicates that the zero cross detector and LE timing module 420 utilizes the immediately preceding half line cycle HLC(n-1) to predict the occurrence of the leading edge of the current half-line cycle HLC(n). In at least one embodiment, the zero cross detector and leading edge (LE) timing module 420 detects the zero crossing ZC(n-1) of the half line cycle HLC(n-1). In operation 504, the responsive current control module 418 sets the dimmer current $i_{\phi\_R}$ to a predetermined "glue value" upon detection of the zero crossing ZC(n-1). When the dimmer current $i_{\phi\_R}$ is set to the glue value, the dimmer current $i_{\phi\_R}$ is sometimes referred to as a "glue current". Exemplary glue values are 10 mA to 300 mA. In operation 506, the zero cross detector and leading edge (LE) timing module 420 detects the leading edge time for half line cycles HLC(n-x) through HLC(n-y). In at least one embodiment, operation 506 determines the occurrence of the leading edge LE(n-1) for HLC (n-1). Upon detection of the zero crossing ZC(n-1) and the occurrence of the leading edge LE(n-1) for the half line cycle HLC(n-1), in operation 508, the zero cross detector and leading edge (LE) timing module 420 determines a time period $T_{OFF(n)}$-1 representing the elapsed time between the occurrences of ZC(n-1) and LE(n-1). The zero cross detector and leading edge (LE) timing module 420 provides the time period $T_{OFF(n-1)}$ to the LE predictor 422. In operation 508, LE predictor 422 predicts the leading edge occurrence time period of the half line cycle HLC(n) as $T_{OFF(n-1)}$ minus an offset value $T_{OS(n)}$, and the subtraction result is referred to as the "predicted $T_{OFF(n)P}$". In at least one embodiment, the LE predictor 422 stores the predicted $T_{OFF(n)P}$ in a memory (not shown), and the responsive current control module 418 retrieves the predicted $T_{OFF(n)}$ for the memory. In at least one embodiment, the LE predictor 422 provides the predicted $T_{OFF(n)P}$ to the responsive current control module 418.

The offset value $T_{OS(n)}$ provides a margin of error for a leading edge in the current half line cycle HLC(n) that occurs earlier than a leading edge of the immediately preceding leading edge of the line cycle HLC(n-1) relative to the zero crossings of the half line cycles. The particular choice of the offset value $T_{OS(n)}$ is a matter of design choice. In at least one embodiment, the offset value $T_{OS(n)}$ is set to a fixed value such as 400 μsec. In at least one embodiment, the LE predictor 422 determines the offset value $T_{OS(n)}$ based on the measured dimmer non-conductive durations for N previous half line cycles, where N is an integer greater than or equal to 2. In at least one embodiment, the LE predictor 422 determines a trend of the actual durations of the dimmer non-conductive states and utilizes the trend to determine an offset value $T_{OS(n)}$. In at least one embodiment, to utilize the trend to determine an offset value $T_{OS(n)}$, the LE predictor 422 determines a rate of change of the actual durations of the dimmer non-conductive state time periods $T_{OFF(n-1)A}$ through $T_{OFF(n-N)A}$ for a set of N cycles of the phase-cut input voltage $V_{\phi\_R}$ (or $V_{\phi\_DIM}$), and applies the rate of change to a previous offset $T_{OS(n)}$-1 to determine the value of the current offset $T_{OS(n)}$ so that the rate of change between the current offset $T_{OS(n)}$ and the previous offset $T_{OS(n-1)}$ is approximately the same as the change of the actual durations of the dimmer non-conductive states. In operation 510, the zero cross detector and leading edge (LE) timing module 420 determines the actual time period $T_{OFF(n)A}$ and stores the value of the actual time period $T_{OFF(n)A}$ in a memory (not shown) or provides the actual time period $T_{OFF(n)A}$ to the responsive current control module 418.

The leading edge of the current half line cycle HLC(n) either occurs earlier, at the same time, or later than the leading edge of the immediately preceding half line cycle HLC(n-1) relative to the preceding zero crossing. In at least one embodiment, the leading edge occurs is a function of a dimmer setting of dimmer 312. As subsequently described in more detail, the responsive current control module 418 responds differently depending on whether the actual elapsed time period $T_{OFF(n)A}$ between the zero crossing ZC(n) and the leading edge LE(n) of the current half line cycle HLC(n) is equal to or shorter than or longer than the predicted $T_{OFF(n)P}$.

In operation 512, the responsive current control module 418 determines whether the actual time period $T_{OFF(n)A}$ is greater than the predicted time period $T_{OFF(n)P}$. If the actual time period $T_{OFF(n)A}$ is greater than the predicted time period $T_{OFF(n)P}$, the responsive current control module 418 performs operation 514 to transition the dimmer current $i_{\phi\_R}$ from the glue value to a lower, firing current value. The firing current value of the dimmer current $i_{\phi\_R}$ is the value of the dimmer current $i_{\phi\_R}$ when the dimmer 312 begins to conduct. The adaptive timing and responsive current control process 500 then returns to operation 502 and repeats for the next half line cycle of the phase-cut input voltage $V_{\phi\_R}$.

Waveforms 600 depict the operation 512 scenario of the actual elapsed time period $T_{OFF(n)A}$ between the zero crossing ZC(n) and the leading edge LE(n) of the current half line cycle HLC(n) is longer than the predicted elapsed time $T_{OFF(n)P}$ between the zero crossing ZC(n) and the leading edge LE(n) of the current half line cycle HLC(n) minus an offset $T_{OS(n)}$. In operation 512, the responsive current control module 418 actively controls the dimmer current $i_{\phi\_R}$ to transition the dimmer current $i_{\phi\_R}$ from the glue value to the firing value. The particular rate of transition is a matter of design choice. In at least one embodiment, the rate of transition is fast enough that dimmer current $i_{\phi\_R}$ should reach the firing value prior to the actual occurrence of the leading edge of the half line cycle HLC(n). In at least one embodiment, the firing value equals an "attach current" value and is, for example, 50 mA. An attach state begins at the leading edge LE(n) and occurs during an initial charge transfer period from the leading edge LE(n). In at least one embodiment, without the attach current, if the dimmer current $i_{\phi\_R}$ transitions all the way to the holding current value prior to the leading edge LE(n), the power converter system 402 can present a large enough input impedance that inadequately damps the RLC network 412.

Figure 7:
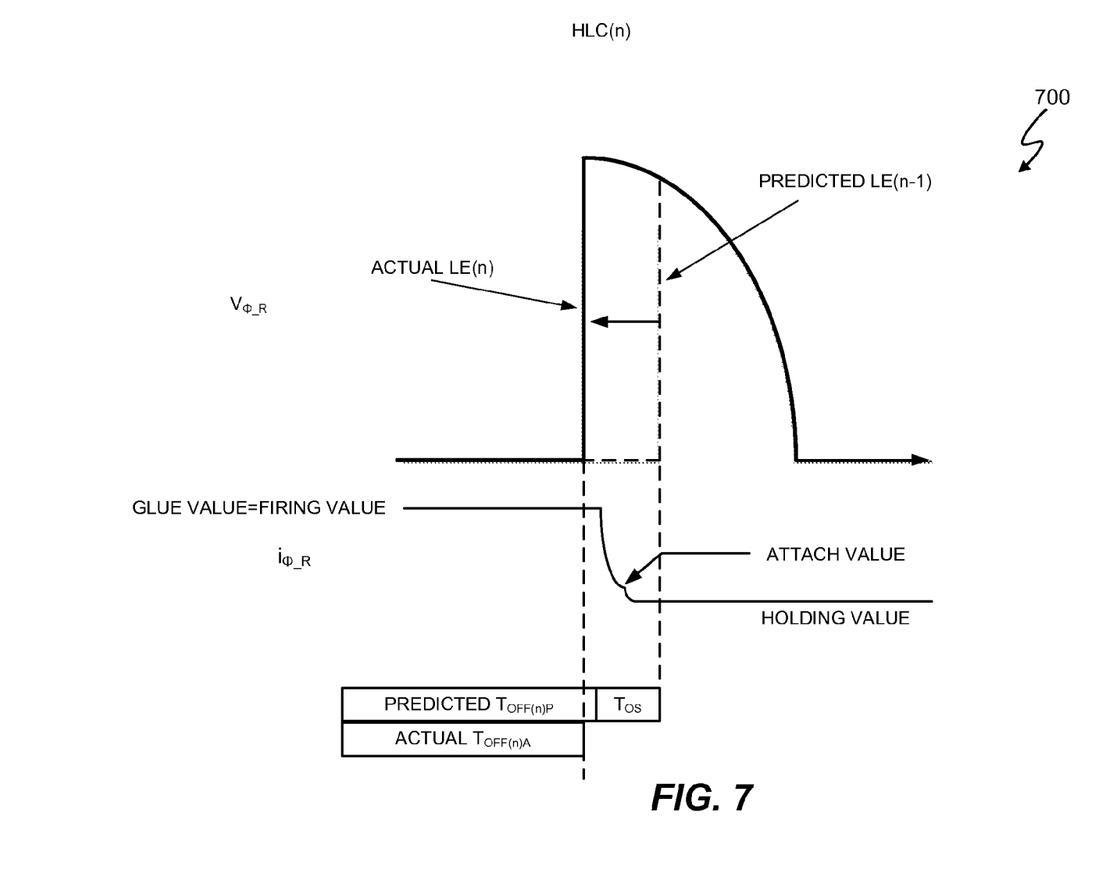

FIG. 7 depicts exemplary waveforms 700 for the current half cycle HLC(n) when, if superimposed, the current leading edge LE(n) would occur prior to the previous leading edge LE(n−1). Referring to FIGS. 4, 5, and 7, in operation 512, if the zero cross detector and leading edge (LE) timing module 420 detects the current leading edge LE(n) and the responsive current control module 418 determines the actual time period $T_{OFF(n)A}$ is less than or equal to the predicted $T_{OFF(n)P}$ as depicted in FIG. 7, the dimmer 312 began conducting prior to an end of the predicted time period $T_{OFF(n)P}$. Thus, the glue value for dimmer current $i_{\phi\_R}$ is the same as the firing value as indicated in operation 516. In operation 518, the responsive current control module 418 transitions the dimmer current $i_{\phi\_R}$ to the attach current value and then to the holding current value. The adaptive timing and responsive current control process 500 then returns to operation 502 and repeats for the next half line cycle of the phase-cut input voltage $V_{\phi\_R}$.

Figure 8:
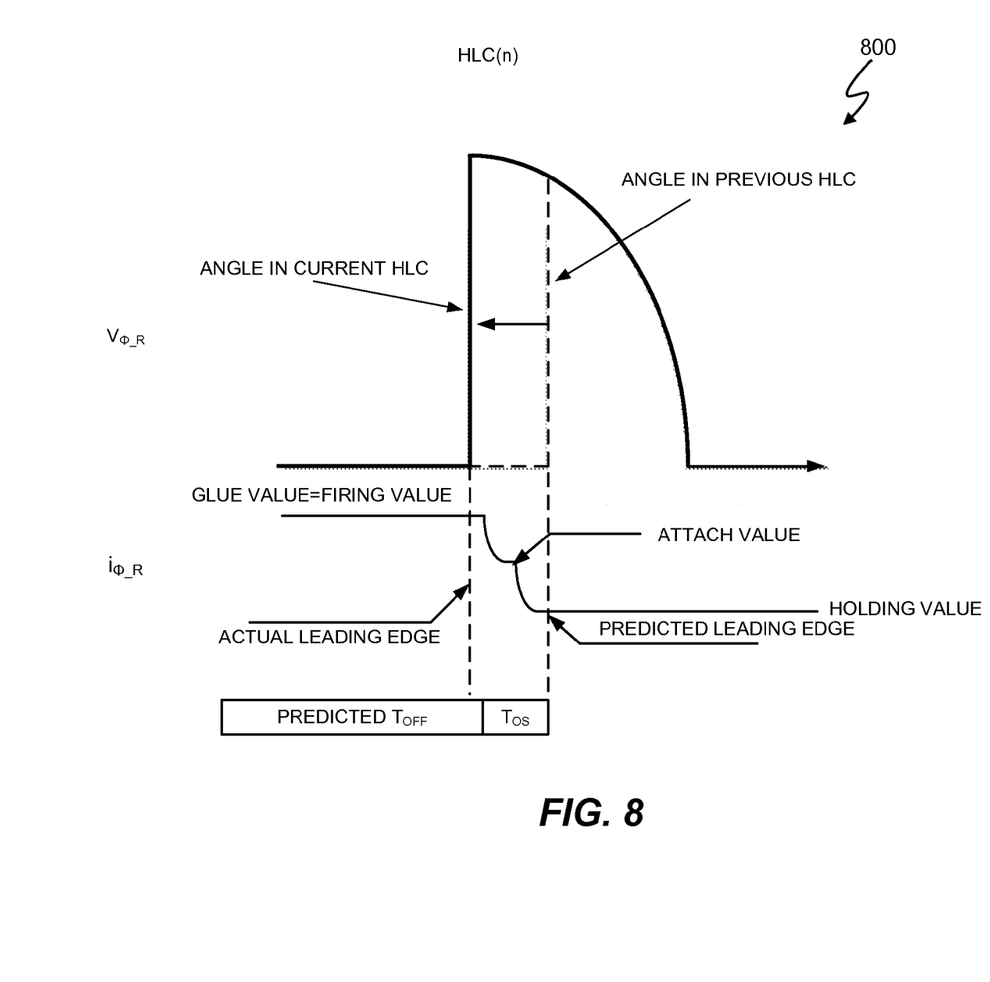

FIG. 8 depicts exemplary waveforms 800 for the current half cycle HLC(n) when, if superimposed, the current leading edge LE(n) would occur prior to the previous leading edge LE(n−1). Referring to FIGS. 4, 5, and 8, the phase-cut input voltage $V_{\phi\_R}$ is identical for waveforms 700 and 800. However, when in operation 512, the zero cross detector and leading edge (LE) timing module 420 detects the current leading edge LE(n) and the responsive current control module 418 determines the actual time period $T_{OFF(n)A}$ is less than or equal to the predicted $T_{OFF(n)P}$, in operation 518, and the responsive current control module 418 transitions the dimmer current $i_{\phi\_R}$ to a higher attach current value than the attach current value in the dimmer current $i_{\phi\_R}$ in waveforms 700. The higher attach current value provides a smoother transition from the glue value to the holding value for the dimmer current $i_{\phi\_R}$. In at least one embodiment, the smoother transition assists in preventing a premature disconnect of the dimmer 312. The adaptive timing and responsive current control process 500 then returns to operation 502 and repeats for the next half line cycle of the phase-cut input voltage $V_{\phi\_R}$. Additionally, in at least one embodiment, not only does the attach current value increase, in at least one embodiment, the responsive current control module 418 actively controls the duration of the dimmer current $i_{\phi\_R}$ at the attach current, and generally increases the duration, to help ensure a smooth transition for the dimmer current $i_{\phi\_R}$ from the attach value to the holding value.

Figure 9:
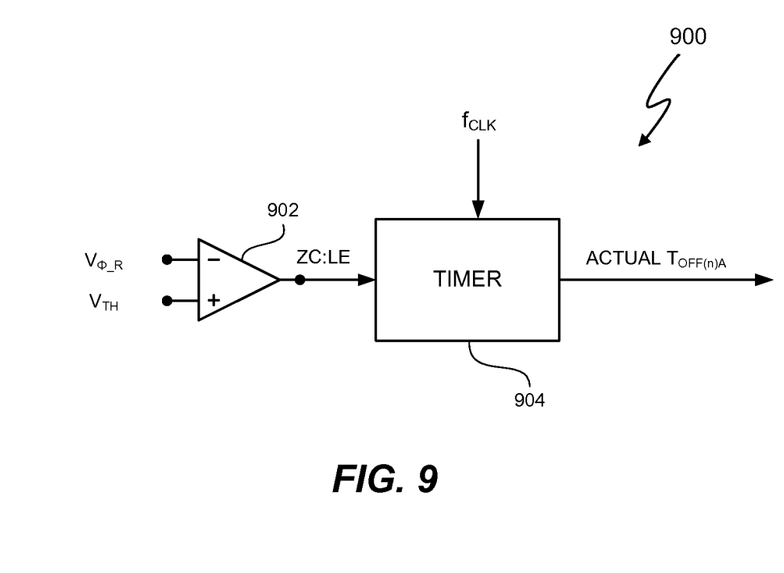
FIG. 9 depicts an exemplary zero cross detector and leading edge (LE) timing module.

FIG. 9 depicts zero cross detector and leading edge (LE) timing module 900, which represents one embodiment of zero cross detector and leading edge (LE) timing module 420. Comparator 902 compares a sensed version of the phase-cut input voltage $V_{\phi\_R}$ to a known threshold value $V_{TH}$. In at least one embodiment, the threshold value within the range of 0-10V, such as 5V. When the phase-cut input voltage $V_{\phi\_R}$ is greater than the threshold value, the output ZC:LE of the comparator 902 is a logical 0. When the phase-cut input voltage falls below the threshold value $V_{TH}$, which indicates a zero crossing, the output ZC:LE transitions from a logical 0 to a logical 1. When the output ZC:LE transitions from a logical 0 to a logical 1, the timer 904 begins counting pulses of a periodic clock signal $f_{CLK}$ having a known frequency to timer 904. When the dimmer 312 transitions from nonconductive to conductive, a leading edge of the phase-cut input voltage $V_{\phi\_R}$ occurs, and the phase-cut input voltage $V_{\phi\_R}$ rises. When the phase-cut input voltage rises above the threshold value $V_{TH}$, the output ZC:LE of the comparator 902 transitions from a logical 1 to a logical 0. At the transition from a logical 1 to a logical 0, the timer 904 marks the number of elapsed clock signal $f_{CLK}$ pulses since the previous zero crossing detection. The elapsed number of clock signal $f_{CLK}$ pulses represent the actual time period $T_{OFF(n)A}$. The timer 904 then resets to determine the actual time period for the next half line cycle of the phase-cut input voltage $V_{\phi\_R}$.

Figure 10:
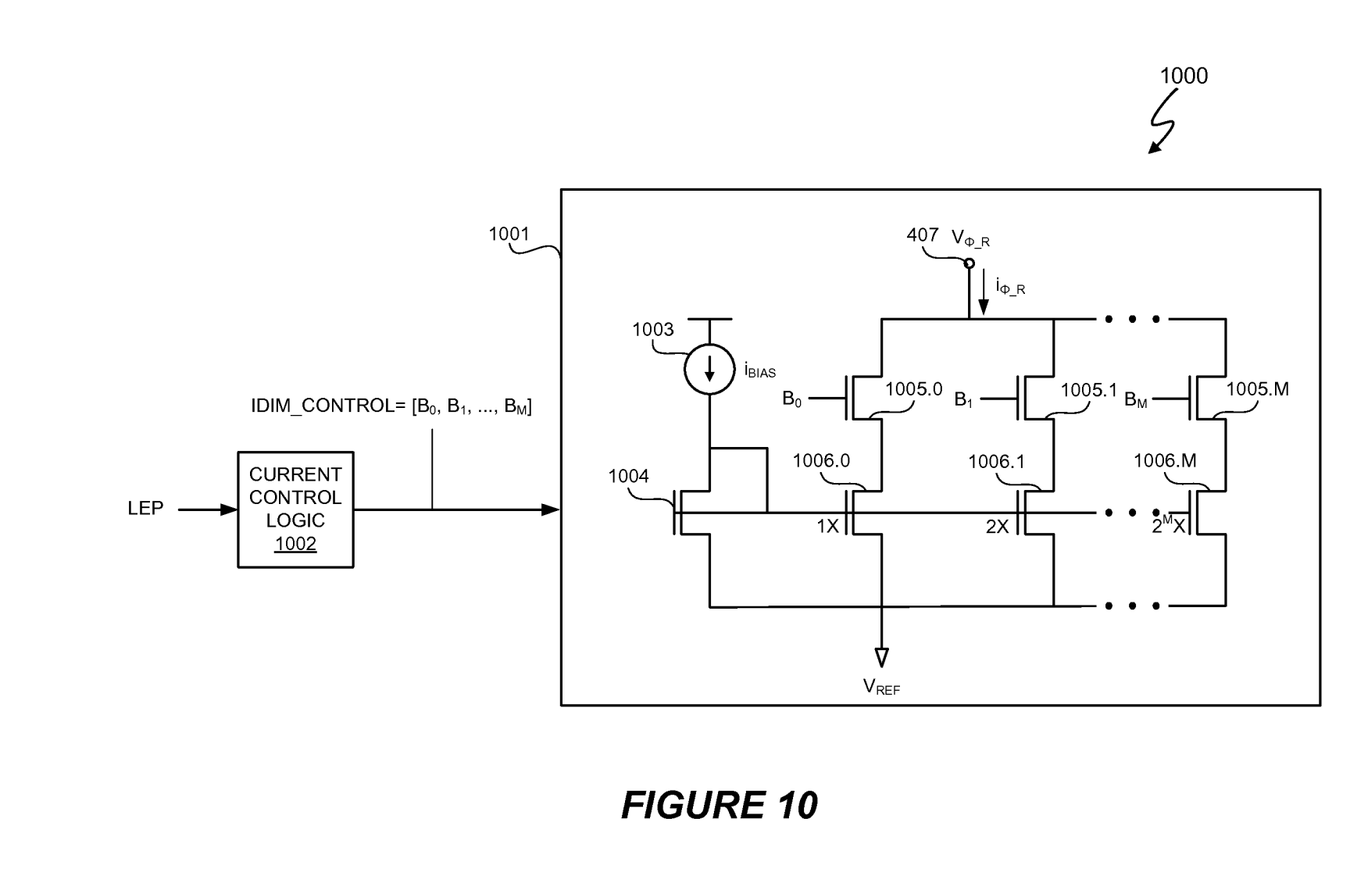
FIG. 10 depicts an exemplary responsive current control module.

FIG. 10 depicts a responsive current control module 1000, which represents one embodiment of the responsive current control module 418. The current control logic 1002 receives the leading edge prediction signal LEP from the LE predictor 422 and performs operations 512 and 516. To control the dimmer current $i_{\phi\_R}$ transitions in operations 514 and 518, the control logic 1002 controls a digital current control value iDIM_CONTROL. The current control value iDIM_CONTROL is an M+1 bit signal having bits $[B_0, B_1, \ldots, B_M]$, and M is a positive integer, such as 4, 8, or 16. The digital current control value iDIM_CONTROL is an input to a current source 1001, which controls the value of the dimmer current $i_{\phi\_R}$.

During operation, current source 1001 sources current from source voltage node 407 and provides a variable impedance path for dimmer current $i_{\phi\_R}$ to control the value of the dimmer current $i_{\phi\_R}$. Current source 1001 includes a bias current source 1003 that generates a bias current $i_{BIAS}$. A drain and gate of FET 1004 are connected together to form a "diode connected" configuration. The M+1 series connected FET pairs 1005.0/1006.0 through 1005.N/1006.N are respectively configured in a current mirror arrangement with FET 1004 to mirror the bias current $i_{BIAS}$. "M" is an integer, and the value of M is a matter of design choice. Each pair of FETs 1005.X/1006.X is sized so that each subsequent pair sources twice as much current as the previous pair, e.g. FET pair 1005.1/1006.1 sources twice as much current as FET pair 1005.0/1006.0, and so on. "X" is an integer index ranging from 0 to M. In at least one embodiment, the value of M determines a maximum level of current capable of being sourced through current source 1001.

In at least one embodiment, the variable impedance control signal I_VAR is a digital value having M+1 bits, i.e. I_VAR=[$B_0, B_1, \ldots, B_M$]. Each bit $B_0, B_1, \ldots, B_M$ is applied to the gate of a respective FET pair 1005.0/1006.0, 1005.1/1006.1, ..., 1005.M/1006.M to control conductivity of the FET pairs. To operate the current source 1001, current control logic 1002 (FIG. 10) sets a logical value of I_VAR to set bits [$B_0, B_1, \ldots, B_M$]. For example, to turn all of the FET pairs ON, boost controller CCM/CRM controller 1202 sets [$B_0, B_1, \ldots, B_M$]=[1, 1, ..., 1] to cause each FET pair 1005.0/1006.0, 1005.1/1006.1, ..., 1005.M/1006.M to conduct and sets bits to a logical value of I_VAR to $B_0, B_1, \ldots, B_M$=[0, 0, ..., 0] to cause each FET pair 1005.0/1006.0, 1005.1/1006.1, ..., 1005.M/1006.M to turn "off", i.e. nonconductive. In at least one embodiment, to current control logic 1002 decreases the value of bits [$B_0, B_1, \ldots, B_M$] so that the current $i_{\phi\_R}$ follows the decreasing transition set as, for example, shown in FIGS. 6, 7, and 8.

Thus, in at least one embodiment, an electronic system adapts current control timing for half line cycle of a phase-cut input voltage and responsively controls a dimmer current in a power converter system. The adaptive current control time and responsive current control provides, for example, interfacing with a dimmer.

Although embodiments have been described in detail, it should be understood that various changes, substitutions, and alterations can be made hereto without departing from the spirit and scope of the invention as defined by the appended claims.

What is claimed is:

1. A method comprising:
    predicting a time period during a cycle of a phase-cut input voltage to a power converter system that is expected to occur in advance of a leading edge of the phase-cut input voltage; and
    during the cycle of the phase-cut input voltage, actively controlling a decreasing transition rate of a current conducted through a dimmer at least by the predicted time period that is expected to occur in advance of the leading edge of the phase-cut input voltage.

2. The method of claim 1 wherein predicting a time period during a cycle of a phase-cut input voltage that is expected to occur in advance of a leading edge of the phase-cut input voltage comprises:
    predicting a duration of a dimmer non-conductive state; and
    reducing the predicted duration of the dimmer non-conductive state by a current offset to determine the predicted time period during a cycle of the phase-cut input voltage that is expected to occur in advance of a leading edge of the phase-cut input voltage.

3. The method of claim 2 wherein a value of the offset is a fixed amount of time for each cycle of the phase-cut input voltage.

4. The method of claim 2 further comprising:
    determining an actual duration of the dimmer non-conductive state for each of N cycles of the phase-cut input voltage, wherein N is an integer greater than or equal to 2;
    determining a trend of the actual durations of the dimmer non-conductive state durations; and
    utilizing the trend to determine a value of the offset.

5. The method of claim 4 wherein utilizing the trend to determine the value of the current offset comprises:
    determining a rate of change of the actual durations of the dimmer non-conductive states for a set of cycles of the phase-cut input voltage; and
    applying the rate of change to a previous offset to determine the value of the current offset so that the rate of change between the current offset and the previous offset is approximately the same as the change of the actual durations of the dimmer non-conductive states.

6. The method of claim 1 wherein actively controlling a decreasing transition of a current conducted through a dimmer comprises:
    actively controlling a current digital-to-analog converter to source current through the dimmer to decrease the transition rate of the current conducted through the dimmer that is expected to occur in advance of the leading edge of the phase-cut input voltage.

7. The method of claim 1 further comprising:
    sensing N leading edges of N cycles of a phase-cut input voltage, wherein N is an integer greater than or equal to 1;
    wherein predicting a time period during a cycle of a phase-cut input voltage to a power control system that is expected to occur in advance of a leading edge of the phase-cut input voltage comprises predicting an occurrence of a leading edge of an upcoming cycle of the phase-cut input voltage based on when a leading edge occurred in the N cycles.

8. The method of claim 1 wherein predicting a time period during a cycle of a phase-cut input voltage to a power control system that is expected to occur in advance of a leading edge of the phase-cut input voltage comprises predicting the leading edge of the phase-cut input voltage for the upcoming cycle to occur during a cycle at the same as a sensed occurrence of the leading edge during an immediately preceding cycle of the phase-cut input voltage.

9. The method of claim 1 wherein actively controlling a decreasing transition of a current comprises:
    varying an impedance of a variable impedance so that the current through the triac-based dimmer tracks a decreasing function set by a low pass filter.

10. The method of claim 9 wherein varying an impedance comprises varying a current from a digitally controlled current digital-to-analog converter.

11. The method of claim 1 wherein actively controlling a decreasing transition rate of a current conducted through a dimmer further comprises:
    actively controlling the decreasing transition rate of the current from a glue value to an attach value;
    wherein the method further comprises:
    actively controlling a duration of the current at the attach value to smooth a transition of the current from the glue value to a holding value, wherein the glue value is greater than the attach value, and the attach value is greater than the holding value.

12. The method of claim 1 wherein the power converter system includes a switching power converter, and the method further comprises:
    controlling the switching power converter to provide power to a load.

13. The method of claim 12 wherein the load comprises one or more light emitting diodes.

14. An apparatus comprising:
    a controller configured to:
        predict a time period during a cycle of a phase-cut input voltage to a power converter system that is expected to occur in advance of a leading edge of the phase-cut input voltage; and
        during the cycle of the phase-cut input voltage, actively control a decreasing transition rate of a current conducted through a dimmer at least by the predicted time period that is expected to occur in advance of the leading edge of the phase-cut input voltage.

15. The apparatus of claim 14 wherein to predict a time period during a cycle of a phase-cut input voltage that is expected to occur in advance of a leading edge of the phase-cut input voltage the controller is further configured to:
predict a duration of a dimmer non-conductive state; and
reduce the predicted duration of the dimmer non-conductive state by a current offset to determine the predicted time period during a cycle of the phase-cut input voltage that is expected to occur in advance of a leading edge of the phase-cut input voltage.

16. The apparatus of claim 15 wherein a value of the offset is a fixed amount of time for each cycle of the phase-cut input voltage.

17. The apparatus of claim 15 wherein the controller is further configured to:
determine an actual duration of the dimmer non-conductive state for each of N cycles of the phase-cut input voltage, wherein N is an integer greater than or equal to 2;
determine a trend of the actual durations of the dimmer non-conductive state durations; and
utilize the trend to determine a value of the offset.

18. The apparatus of claim 17 wherein to utilize the trend to determine the value of the current offset the controller is further configured to:
determine a rate of change of the actual durations of the dimmer non-conductive states for a set of cycles of the phase-cut input voltage; and
apply the rate of change to a previous offset to determine the value of the current offset so that the rate of change between the current offset and the previous offset is approximately the same as the change of the actual durations of the dimmer non-conductive states.

19. The apparatus of claim 14 wherein to actively control a decreasing transition of a current conducted through a dimmer the controller is further configured to:
actively control a current digital-to-analog converter to source current through the dimmer to decrease the transition rate of the current conducted through the dimmer that is expected to occur in advance of the leading edge of the phase-cut input voltage.

20. The apparatus of claim 14 wherein the controller is further configured to:
sense N leading edges of N cycles of a phase-cut input voltage, wherein N is an integer greater than or equal to 1;
wherein to predict a time period during a cycle of a phase-cut input voltage to a power control system that is expected to occur in advance of a leading edge of the phase-cut input voltage, the controller is further configured to predict an occurrence of a leading edge of an upcoming cycle of the phase-cut input voltage based on when a leading edge occurred in the N cycles.

21. The apparatus of claim 14 wherein to predict a time period during a cycle of a phase-cut input voltage to a power control system that is expected to occur in advance of a leading edge of the phase-cut input voltage, the controller is further configured to predict the leading edge of the phase-cut input voltage for the upcoming cycle to occur during a cycle at the same as a sensed occurrence of the leading edge during an immediately preceding cycle of the phase-cut input voltage.

22. The apparatus of claim 14 wherein to actively control a decreasing transition of a current the controller is further configured to:
vary an impedance of a variable impedance so that the current through the triac-based dimmer tracks a decreasing function set by a low pass filter.

23. The apparatus of claim 22 wherein to vary an impedance, the controller is further configured to vary current from a digitally controlled current digital-to-analog converter.

24. The apparatus of claim 14 wherein to actively control a decreasing transition rate of a current conducted through a dimmer the controller is further configured to:
actively control the decreasing transition rate of the current from a glue value to an attach value;
wherein the controller is further configured to actively control a duration of the current at the attach value to smooth a transition of the current from the glue value to a holding value, wherein the glue value is greater than the attach value, and the attach value is greater than the holding value.

25. The apparatus of claim 14 wherein the power converter system includes a switching power converter, and the controller is further configured to:
control the switching power converter to provide power to a load.

26. The apparatus of claim 25 wherein the load comprises one or more light emitting diodes.

27. An apparatus comprising:
a switching power converter;
a controller coupled to the switching power converter and configured to:
predict a time period during a cycle of a phase-cut input voltage to a power converter system that is expected to occur in advance of a leading edge of the phase-cut input voltage; and
during the cycle of the phase-cut input voltage, actively control a decreasing transition rate of a current conducted through a dimmer at least by the predicted time period that is expected to occur in advance of the leading edge of the phase-cut input voltage; and
a load coupled to the switching power converter.

28. The apparatus of claim 27 wherein the load comprises one or more light emitting diodes.

* * * * *